Oct. 23, 1934.                J. E. WRIGHTSMAN                1,977,904
                                REAR VIEW MIRROR
                               Filed Oct. 19, 1932
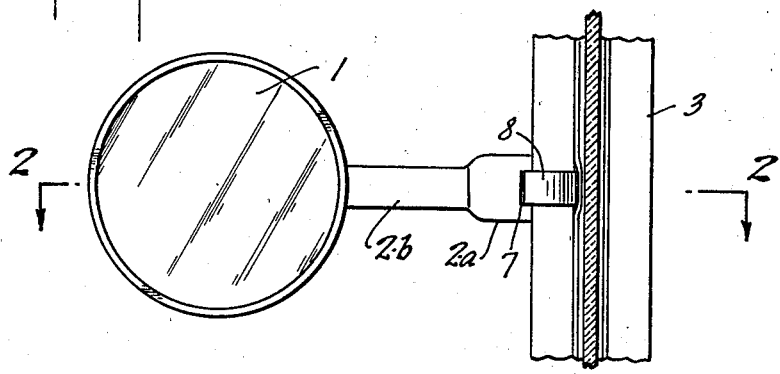
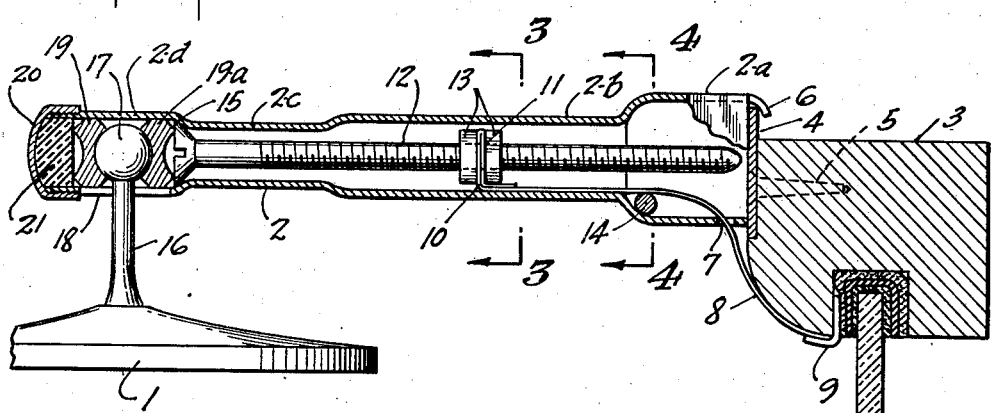
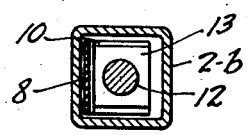   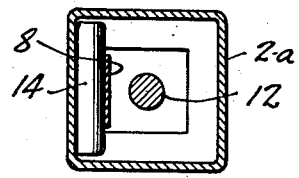
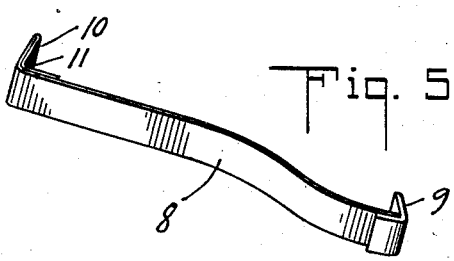
INVENTOR.
John E. Wrightsman
BY Joseph F. Westall
ATTORNEY.

Patented Oct. 23, 1934

1,977,904

UNITED STATES PATENT OFFICE 1,977,904

REAR VIEW MIRROR

John E. Wrightsman, Los Angeles, Calif.

Application October 19, 1932, Serial No. 638,503

3 Claims. (Cl. 248—20)

This invention relates to rear view mirrors for use principally on motor vehicles, and particularly to means for attaching such device in an appropriate location on said vehicle.

One of the principal objections to many conventional types of rear view mirrors is that, for their installation, alteration or mutilation of the windshield post, door-window jamb, or other part of the structure to which they are applied is required, such as the drilling of holes, the attachment of holding devices by screws, clamps, etc.

Another objection is that other forms of such devices are adaptable only for attachment to wind wings.

A primary object of the present invention is to provide a rear view mirror bracket with clamping attachment means which is adaptable for application to various forms and sizes of door-window frames and windshield posts of vehicles now in use, without alteration or mutilation of any part of the structure to which the device is secured.

Still other objects are to provide a rear view mirror and its supporting bracket combining the advantages of simplicity in construction, comparative fewness of parts, speed and facility of assembly, economy of manufacture, ease of installation, even by unskilled laborers, efficiency, such, particularly, as security of attachment, that is to say, freedom from looseness resulting from vibration, and neatness of appearance.

For the purpose of illustrating the salient features of my invention, reference will now be made to the drawing in which,—

Fig. 1 is an elevation of the invention showing its application to an automobile door-window frame; Fig. 2 is a sectional view on line 2—2 of Fig. 1; Fig. 3 is a sectional view on line 3—3 of Fig. 2; Fig. 4 is a section on line 4—4 of Fig. 2; Fig. 5 is a perspective view of the flexible strap, forming part of the clamping means for securing the device to the door-window frame.

Considering in detail the drawing, the numerals of which refer to similar parts throughout the several views, 1 indicates a mirror, with its enclosing frame-casing; 2 a hollow supporting arm for said mirror and its frame, which said supporting arm 2 also forms a housing for part of screw-clamping means hereinafter described, for securing the device to the window frame 3 of the front door of an automobile. Forming practically an integral part of the door-window frame 3, is a weather strip 4, which is illustrated as being secured to frame 3 by screws 5, although any construction of over-hanging flange covering the joint between the door and its jamb may be substituted with the identical effect of the specific construction herein illustrated and described.

Different portions of the length of supporting arm 2 are of different diameters and also of different cross sectional contours, the two innermost, (nearest the car) 2a and 2b, respectively, of said portions of supporting arm 2 being square in cross section and the two outermost, (farthest from the car) 2c and 2d, respectively, of said portions of said supporting arm 2 being circular in cross section.

The portion 2a of said supporting arm 2 (square in cross section) is the largest of the cross sectional diameters of the different portions of said supporting arm; the portion 2b of said arm (being also square in cross section) is of lesser diameter than 2a; the portion 2c of said supporting arm 2 is of still lesser diameter than 2b, and further differs from 2a, and 2b, in being circular in cross section, while the outermost portion of said supporting arm 2, that is to say, the portion 2d is of larger diameter than 2c but like 2c, is circular in cross section.

The end of portion 2a of said supporting arm 2 which is designed (when in attached position) to be in direct contact with the door-window frame of the automobile is square with the longitudinal diameter of said supporting arm 2, except for a hooked flange extension 6 on one of its sides, which flange extension 6 is designed to be hooked under the outer edge of weather strip 4 as part of the means for attachment to the car as hereinafter described.

Near the innermost end of said portion 2a of said supporting arm 2, on the side opposite its hooked flange extension 6, is provided a slot 7, through which a flexible metal strap 8, preferably of steel, loosely and slidably passes, said strap 8 extending on the outside of said slot 7, and ending in a hook or claw 9 which may be integral with, or attached to, the end of strap 8 by any means well known to the art such as by brazing, welding or riveting. The opposite end of strap 8 is doubled for reinforcement and bent over to form (at substantially a right angle to the main portion of said strap) an extension 10, which is provided with an opening 11 through which stove-bolt 12 loosely passes. Nuts 13—13 threaded on stove-bolt 12 are provided for placement on each side of extension 10 of strap 8. A metal roller 14 loosely placed between strap 8 and the wall of its container, portion 2a of supporting arm 2, constitutes an anti-friction device for facilitating movement of strap 8 in or out through slot 7. An inner shoulder 15, resulting from the difference in the diameters of the portions 2c and 2d of supporting arm 2, provides a stop for limiting the inward movement of stove-bolt 12.

It will be obvious from the foregoing description that when stove-bolt 12, nuts 13—13, strap 8 with its extension 10, and roller 14, are assembled, as illustrated most clearly in Fig. 2 of the drawing hereof, a rotation (by means of a screw driver) of stove-bolt 12 will cause nuts 13—13 (themselves being restrained from rotating by the rectangular cross sectional shape of the chamber in which they are assembled) to move to or from (according to the direction of rotation of the stove-bolt) either end of supporting arm 2, thus moving strap 8 through slot 7 either further into or further out of supporting arm 2, and consequently either shortening or lengthening the claw end extension of strap 8.

It will also be clear that a range of movement corresponding to the length of portion 2b of supporting arm 2 is provided for the shortening or lengthening of the distance between hooked flange extension 6 and claw 9, this, in order to accommodate the device to different widths of doors of window frames found in the various makes of cars.

In portion 2d of supporting arm 2 there is provided a ball and socket clamping assembly (of a type well known in the art) for the adjustable support and positioning of the mirror 1, which clamping assembly and its operative connections will now be briefly described: From the center of the back of the frame-casing of mirror 1 and extending at a right angle to the plane of the surface of said mirror there is provided a short stem 16 which terminates in a ball 17. A longitudinal slot 18 in portion 2d of supporting arm 2, said slot being slightly enlarged at approximately its center is provided to receive ball 17, and stem 16 to which said ball is attached. Clamping elements 19 and 19a are assembled inside of said portion 2d, one on each side of ball 17.

A cap 20 screw threaded to the end of portion 2d of said supporting arm 2 having a filler 21 of preferably resilient material, is provided as the screw clamping means by which ball 17, with its attached stem and mirror is frictionally secured in any desired angle of adjustment by tightening said screw cap 20 to compress clamping elements 19 and 19a (with interposed ball 17) between the filler 21 of said cap 20 and the head of stove-bolt 12.

While the accompanying drawing illustrates only one embodiment of my invention, and that as applied to a sedan or coupe, and while the device is illustrated and described as being applied to a door or a window frame, it will be obvious to those of skill in the art to which this invention appertains, that various modifications of the shape or design of the supporting arm, as well as of the clamping fingers, and of other means for their clamping adjustment may be employed, and further, the device may be adapted and applied to other vehicles and other parts or locations than those herein specifically mentioned, forms, and functions of the various parts being accordingly modified to suit the new environment—all without departing from the spirit of my invention.

Having thus described my invention, what I claim as new and desire to secure by Letters Patent is:

1. In an article supporting bracket, a supporting arm, a clamping jaw consisting of a hooked flange forming a part of said arm at a point of its attachment to a structure, a flexible metal strap with a hooked clamping jaw at one of its ends and actuated at its other end by means within said supporting arm to alter the position of said last mentioned clamping jaw with respect to the other.

2. In a device of the character described, a hollow supporting arm, a hooked jaw rigidly attached to said arm, a clamping claw relatively movable with respect to said supporting arm through a flexible connection by screw actuating means contained within said supporting arm.

3. In a device of the character described, a hollow supporting arm for an article to be supported, a clamping jaw forming a part of said supporting arm, a second clamping jaw, a flexible strap connecting said second clamping jaw with its actuating means, an anti-friction roller within said supporting arm to facilitate movement of said flexible strap, and actuating means within said supporting arm to alter the position of said second clamping jaw with respect to the other.

JOHN E. WRIGHTSMAN.